Dec. 19, 1967
H. H. ROTH
3,359,445
ELECTROLUMINESCENT CELLS
Filed Oct. 7, 1964
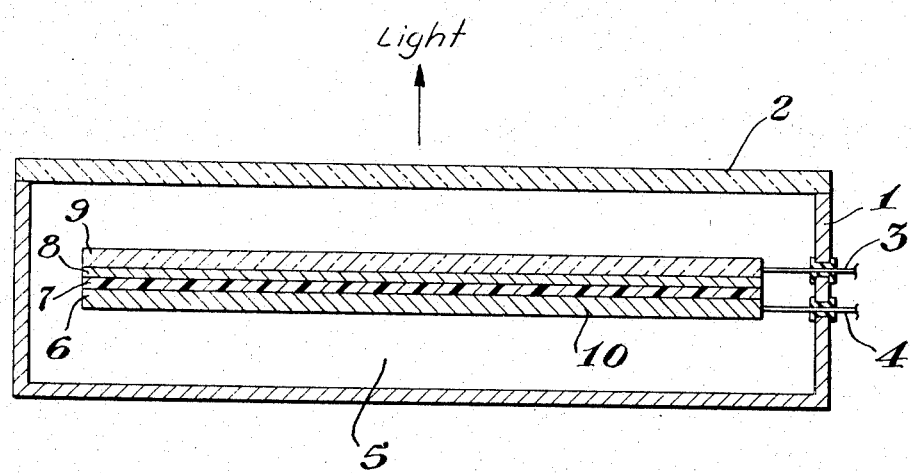
INVENTOR.
Harold H. Roth
BY
ATTORNEY

United States Patent Office 3,359,445
Patented Dec. 19, 1967

3,359,445
ELECTROLUMINESCENT CELLS
Harold H. Roth, Bay City, Mich., assignor to The Dow Chemical Company, Midland, Mich., a corporation of Delaware
Filed Oct. 7, 1964, Ser. No. 402,117
5 Claims. (Cl. 313—108)

This invention relates to improved electroluminescent lamps and a method for their preparation. It more particularly relates to electroluminescent cells which employ organic phosphor compositions having increased emission time.

Organic phosphor compositions which are useful for the generation of light in electroluminescent cells generally comprise fused or conjugated organic ring compounds such as anthracene, perylene, stilbene and the like, in admixture with electrically conductive materials such as metals, graphite, carbon and the like. This art is discussed generally in U.S. patent application Ser. Nos. 59,278, filed Sept. 29, 1960, and 224,655 filed Sept. 19, 1962 and now U.S. Letters Patents 3,172,862 and 3,173,050, respectively. One of the problems encountered with these organic electroluminescent phosphors, under ordinary operating conditions, is the relatively short life of the phosphor.

It is, therefore, an object of the present invention to provide an electroluminescent lamp utilizing an organic phosphor cell whose emission time is greatly improved and which has high brightness per unit area at low voltages and low frequencies.

These and other objects of my invention will either be explained or will become apparent hereinafter.

The figure illustrates a cross-sectional schematic representation of an electroluminescent cell in accordance with the invention.

It has been discovered that the relatively short emission times found with electroluminescent organic phosphors are due to the oxygen present in the atmosphere in which these phosphors operate. Thus, by constructing an electroluminescent lamp whereby the atmosphere surrounding the cell can be controlled and oxygen excluded therefrom, the emission time of the organic phosphor is greatly improved.

The atmosphere surrounding the cell can be controlled in several ways, one of which is to purge constantly the electroluminescent lamp with an oxygen-free gas then seal the lamp to prevent oxygen from entering. Another method is to keep the lamp under a continuous purge for the life of the electroluminescent organic phosphor.

The materials used in the construction of the lamp can be any type of plastic or glass available, so long as the oxygen permeability is within the specified range. The lamp can be made so that it is rigid or flexible. Because four parts per million of oxygen cause a light decay rate of about 4 percent per hour, the oxygen content of the inert atmosphere must be below 1 p.p.m., and preferably less than 0.1 p.p.m.

The organic phosphors and configuration of electrodes used in the present invention are described in U.S. patent applications, Ser. Nos. 59,278 and 224,655, filed Sept. 29, 1960, and Sept. 19, 1962, respectively.

The electroluminescent lamp which is the subject of the present invention can be described by reference to the accompanying figure. The electroluminescent lamp comprises luminescent cell 10 which consists of transparent face electrode 9 to which coating 8 of an adherent phosphor has been applied.

Semi-conducting layer 7 covers and is adjacent to the phosphor coating without contacting the transparent face electrode. Opaque electrode 6 covers and is adjacent to the semi-conducting layer without contacting the phosphor coating. All of these layers are pressed tightly together for intimate contact. Electroluminescent cell 10 is contained in sealed envelope 1 with transparent top 2. The materials of the envelope may be rigid or flexible, but should be relatively impermeable to oxygen, for example, but by no means exclusively, polyvinyl alcohol, vinylidene chloride-vinyl chloride copolymer, and regenerated cellulose (cellophane). The limits of permeability should preferably be no greater than 0.1 and most beneficially be no greater than 0.005 cc./100 sq. in./24 hours/mil at 1 atmosphere room temperature. Chamber 5 inside envelope 1 is free of oxygen and preferably contains a relatively inert gas, such as nitrogen, carbon dioxide, helium and the like. Connections 3 and 4 to the lamp are through vapor tight seals.

The improved electroluminescent cells of my invention are illustrated in the following examples.

Example I

A phosphor coating consisting of 2 mils of a mixture of 0.075 gram of tetracene-doped anthracene plus 0.022 gram Oildag (a 10 percent colloidal graphite in oil) in 15 ml. of benzene, was sprayed over 2.6 square inches of tin oxide coated glass plate (1½ inches x 3 inches x 4 mm.). This was clamped to a semiconductor layer comprising ball-milled dry cuprous oxide powder spread thinly over an aluminum plate slide. A cellophane tape spacer, 2½ mils thick, was positioned between the phosphor layer and the aluminum plate electrode to control the thickness of the semiconductor layer. This was placed in a box under a nitrogen gas purge, with a photocell attached for recording the light intensity and emission time of the light. After 30 minutes of nitrogen gas purging, a light intensity of 0.16 foot-Lambert was measured at 90 volts, 60 cycles. This was held steady for 4 minutes, then the box was purged with cylinder oxygen. The brightness dropped to 0.08 foot-Lambert in 0.2 minute, then to 0.01 foot-Lambert in 1.4 minutes.

Example II

Tetracene-doped p-terphenyl being used in place of the tetracene-doped anthracene, the cell was constructed in the same manner as in Example I and was placed in a box purged with nitrogen containing approximately 2 p.p.m. oxygen. After 23 hours of purging, a light intensity of 0.16 foot-Lambert was measured with 2.2 milliamperes current at 70 volts, 60 cycles. A 38 percent decay, determined by loss in light intensity, was noted after 38 minutes of operation at 70 volts. On purging the box with air, a loss in brightness from 0.0993 ft.-Lambert to 0.0496 ft.-Lambert in 0.15 minute was experienced by the organic phosphor, and then on to zero brightness in 0.95 minute.

Example III

Using a tetracene-doped chrysene organic phosphor cell, constructed as in Examples I and II, the nitrogen purge of the box was maintained for 3 hours. At 90 volts, 60 cycles, a lamp brightness of 0.05 foot-Lambert was measured, with a 33 percent decay occurring in 28 minutes. The nitrogen contained 10 p.p.m. oxygen. In air, 50 percent decay occurs in 0.4 minute, and a zero brightness was noted after 3.3 minutes.

As illustrated in the examples, when oxygen above 1 or 2 p.p.m. is excluded from the electroluminescent cell, decay rates are negligible and emission time is greatly improved. By introducing very small amounts of oxygen into the lamp the organic phosphors decay at relatively rapid rates. Thus, by constructing an electroluminescent lamp that is relatively impermeable to oxygen, there would be great savings in replacement costs.

Electroluminescent lamps using organic phosphor cells, as described herein, can be constructed so as to be rigid and relatively "hard" or they can be laminated in films so as to be flexible, depending on the particular application for which they are desired.

I claim:
1. In an electroluminescent lamp comprising an electroluminescent organic phosphor cell enclosed in an envelope, said lamp containing an inert gas atmosphere, the improvement which comprises construction of the envelope from materials that are relatively impermeable to oxygen, the permeability limits being no greater than 0.1 cc./100 sq. in./24 hours/mil at 1 atmosphere at room temperature, and limitation of the oxygen content in the inert gas atmosphere to less than about 1 part per million.

2. An electroluminescent lamp as in claim 1 which is constructed from materials that are relatively impermeable to oxygen, the permeability limits being no greater than 0.005 cc./100 sq. in./24 hours/mil at 1 atmosphere at room temperature.

3. An electroluminescent lamp as in claim 1 where the electroluminescent organic phosphor is tetracene-doped anthracene.

4. An electroluminescent lamp as in claim 1 where the electroluminescent organic phosphor is tetracene-doped p-terphenyl.

5. An electroluminescent lamp as in claim 1 where the electroluminescent organic phosphor is tetracene-doped chrysene.

References Cited

UNITED STATES PATENTS

| | | | |
|---|---|---|---|
| 2,755,400 | 7/1956 | Stiles | 313—15 |
| 2,955,221 | 10/1960 | Thorington | 313—108 |
| 3,166,687 | 1/1965 | Venes | 313—108 |
| 3,172,862 | 3/1965 | Gurnee et al. | 252—301.3 |
| 3,173,050 | 3/1965 | Gurnee | 313—108 |

FOREIGN PATENTS

| | | |
|---|---|---|
| 1,318,673 | 1/1963 | France. |

JOHN W. HUCKERT, *Primary Examiner.*

J. SHEWMAKER, *Assistant Examiner.*